United States Patent
Van Der Wal et al.

(10) Patent No.: US 10,604,002 B2
(45) Date of Patent: Mar. 31, 2020

(54) WHEEL FOR A ROAD VEHICLE

(71) Applicant: E-TRACTION EUROPE B.V., Apeldoorn (NL)

(72) Inventors: Reinhard Peter Van Der Wal, Spijkenisse (NL); Timothy Seventer, Arnhem (NL)

(73) Assignee: E-TRACTION EUROPE B.V., Apeldoorn (NL)

(*) Notice: Subject to any disclaimer, the term of this patent is extended or adjusted under 35 U.S.C. 154(b) by 0 days.

(21) Appl. No.: 16/071,690

(22) PCT Filed: Jan. 19, 2017

(86) PCT No.: PCT/NL2017/050034
§ 371 (c)(1),
(2) Date: Jul. 20, 2018

(87) PCT Pub. No.: WO2017/126965
PCT Pub. Date: Jul. 27, 2017

(65) Prior Publication Data
US 2019/0023118 A1    Jan. 24, 2019

(30) Foreign Application Priority Data

Jan. 20, 2016  (NL) .................................... 2016127

(51) Int. Cl.
*B60K 7/00* (2006.01)
*H02K 9/19* (2006.01)
(Continued)

(52) U.S. Cl.
CPC ............ *B60K 7/0007* (2013.01); *B60B 7/063* (2013.01); *H02K 1/30* (2013.01); *H02K 7/14* (2013.01);
(Continued)

(58) Field of Classification Search
CPC ........ B60B 7/063; B60K 7/0007; B60K 7/14; B60K 2007/0038; B60K 2007/0092;
(Continued)

(56) References Cited

U.S. PATENT DOCUMENTS 5,327,034 A * 7/1994 Couture ............... B60K 7/0007
310/64
5,442,250 A * 8/1995 Stridsberg ............ B60K 7/0007
310/186

(Continued)

FOREIGN PATENT DOCUMENTS

CN    1 852 008    10/2006
CN    201 745 428    2/2011
(Continued)

OTHER PUBLICATIONS

International Search Report, PCT/NL2017/050034, dated Mar. 3, 2017.

*Primary Examiner* — James A Shriver, II
*Assistant Examiner* — Steve Clemmons
(74) *Attorney, Agent, or Firm* — Young & Thompson

(57) ABSTRACT

Disclosed is road vehicle wheel with an in-wheel electric motor that includes a rim configured for mounting at least one tire on the rim; a rim support configured for supporting the rim on a non-rotating wheel part to allow rotation of the rim with respect to the non-rotating wheel part; a stator of the in-wheel electric motor, the stator including electromagnets and being supported on the non-rotating wheel part; and a rotor of the in-wheel electric motor, the rotor including permanent magnets and being supported on the rim support such that any forces exerted on the rim do not act on the rotor. The rim is supported such that any forces exerted on the rim are directly born by the rim support and is not in direct contact with the rotor.

20 Claims, 2 Drawing Sheets

(51) Int. Cl.
  *H02K 11/33* (2016.01)
  *H02K 1/30* (2006.01)
  *H02K 7/14* (2006.01)
  *B60B 7/06* (2006.01)
  *H02K 21/22* (2006.01)

(52) U.S. Cl.
  CPC .............. *H02K 9/19* (2013.01); *H02K 11/33* (2016.01); *H02K 21/22* (2013.01); *B60K 2007/0038* (2013.01)

(58) Field of Classification Search
  CPC .......... H02K 1/30; H02K 1/27; H02K 1/2786; H02K 7/14; H02K 9/19; H02K 11/33; H02K 11/21822; H02K 5/161; H02K 5/1732; H02K 5/10; H02K 3/44
  See application file for complete search history.

(56) References Cited

U.S. PATENT DOCUMENTS

| | | | |
|---|---|---|---|
| 5,894,902 A | 4/1999 | Cho | |
| 6,006,870 A * | 12/1999 | Gazyakan | B60B 11/06 180/65.6 |
| 7,059,437 B2 * | 6/2006 | Heinen | B60G 3/01 180/65.51 |
| 8,035,270 B2 * | 10/2011 | Marsh | B60K 7/0007 310/179 |
| 8,581,455 B2 * | 11/2013 | Woolmer | H02K 5/18 180/65.51 |
| 8,820,448 B2 * | 9/2014 | Shiraki | B60K 7/0007 180/65.51 |
| 8,925,662 B2 * | 1/2015 | Han | B60K 17/043 180/65.51 |
| 9,073,425 B2 | 7/2015 | Volger et al. | |
| 9,387,758 B2 * | 7/2016 | Heinen | B60K 7/0007 |
| 9,444,291 B2 * | 9/2016 | Li | H02K 26/00 |
| 9,862,264 B2 * | 1/2018 | Lampic | B60K 7/0007 |
| 2003/0193250 A1 | 10/2003 | Maslov et al. | |
| 2004/0021437 A1 | 2/2004 | Maslov et al. | |
| 2010/0194180 A1 * | 8/2010 | Gibson | B60B 11/04 301/36.1 |
| 2012/0055193 A1 | 3/2012 | Fukasaku | |
| 2013/0257327 A1 | 10/2013 | Dhawan | |

FOREIGN PATENT DOCUMENTS

| | | | |
|---|---|---|---|
| CN | 102 044 932 | 5/2011 | |
| CN | 201 869 070 | 6/2011 | |
| CN | 202 006 723 | 10/2011 | |
| DE | 3528492 A1 * | 2/1987 | .............. H01B 3/40 |
| DE | 10 2011 082117 | 4/2012 | |
| EP | 0 249 808 | 12/1987 | |
| EP | 1 380 459 | 1/2004 | |
| EP | 1 433 242 | 6/2004 | |
| EP | 1 935 082 | 6/2008 | |
| GB | 2 461 168 | 12/2009 | |
| GB | 2 518 028 | 3/2015 | |
| JP | 2005-333706 | 12/2005 | |
| JP | 2007-182194 | 7/2007 | |
| JP | 2007182194 A * | 7/2007 | |
| JP | 2013-085388 | 5/2013 | |
| WO | WO 2006/076321 | 7/2006 | |
| WO | WO 2009/128581 | 10/2009 | |
| WO | WO 2014/207638 | 12/2014 | |

* cited by examiner

WHEEL FOR A ROAD VEHICLE

FIELD OF THE INVENTION

A road vehicle wheel with an in-wheel electric motor, the wheel comprising a rim and a rotor with permanent magnets and a stator with electromagnets.

BACKGROUND OF THE INVENTION

Wheels driven by an electric motor are known. The electric motor can be provided in the car and drive the axis of the wheel to rotate the wheel. This requires the electric motor to be located in the car. Another possibility is to position the electric motor in the wheel itself. Such wheels having an in-wheel electric motor are known as well. Part of the electric motor is generally coupled to the rim of the wheel, the rim carrying the tire of the wheel. Another part of the in-wheel electric motor is generally positioned centrally in the wheel and will constitute a non-rotating part of the wheel. The non-rotating part of the electric motor and part of the electric motor coupled to the rim are generally referred to as stator and rotor, respectively. The interaction between rotor and stator is of magnetic nature, at least one of the rotor and stator comprising electromagnets.

Their mutual distance should be small enough for the electric motor to be able to deliver enough power and torque to the wheel, and preferably as small as practically possible. On the other hand, their mutual distance should be large enough to be able to absorb loads and mechanical impacts on the wheel. Further, large currents are required to provide the necessary power and torque to the motor. This causes a temperature rise of the electric motor and wheel, and cooling is required to limit the temperature rise. Having a maximum of torque available for a given electrical current is very advantageous. Various solutions have been proposed, but they are all quite complicated.

SUMMARY OF THE INVENTION

It is an objective of the invention to provide a wheel for a road vehicle having an in-wheel electric motor that can provide a high torque but takes a relatively small space as compared to known in-wheel electric motors.

It is another or alternative objective of the invention to provide a wheel having an in-wheel electric motor that can provide a high torque but is still sized to allow mounting of tires that are standard for the specific application, such as for buses or cars.

It is yet another or alternative objective of the invention to provide a road vehicle wheel with in-wheel electric motor which can carry high mechanical loads.

At least one of the above objectives is achieved by a road vehicle wheel with an in-wheel electric motor, the wheel comprising
- a rim configured for mounting at least one tire on the rim;
- a rim support configured for supporting the rim on a non-rotating wheel part such as to allow rotation of the rim with respect to the non-rotating wheel part;
- a stator of the in-wheel electric motor, the stator comprising electromagnets and being supported on the non-rotating wheel part; and
- a rotor of the in-wheel electric motor, the rotor comprising permanent magnets and being supported on the rim support such that any forces exerted on the rim do not act on the rotor.

The rotor of the wheel according to the invention does not carry any loads from the rim. An air gap between rotor and stator can therefore be kept very small, which is highly advantageous for an increased efficiency of the electric motor. The rotor on which the permanent magnets are mounted need not be designed for mechanical strength and can therefore be kept very thin. The internal diameter of the rotor can thus be chosen larger at a same external diameter, the rotor can thus effectively be positioned further from the rotation axis, so as to provide a larger internal surface and thus a larger area for magnetic interaction between rotor and stator for a more efficient generation of torque by the electric motor, further enhancing the efficiency of the motor.

In an embodiment the rim is supported such that any forces exerted on the rim are directly born by the rim support. Any load on the rim is directly channelled into the rim support to prevent any load to be exerted on the rotor.

In an embodiment the rim is not in direct contact with the rotor to further lower any risk of forces to be exerted on the rotor by external influences.

In an embodiment there is a gap between the rotor and the rim, especially the gap being filled with a gas, especially air. By having a gap, especially an air gap between rotor and rim the rim may deform due to external forces without coming into contact with the rotor.

In an embodiment the non-rotating part comprises a shaft supporting the rim support, especially through a bearing.

In an embodiment the rim has first and second ends along a rotation axis of the wheel, the rim support being associated with the first and second ends of the rim. Both ends of the rim are in such configuration supported, which is efficient to limit any deformation of the rim.

In an embodiment the rim support comprises first and second plates associated with the first and second ends of the rim, and the rotor being supported by and provided in between the first and second plates. The plates prove to be an efficient means for supporting the rim and to provide a support for the rotor as well. The plates very effectively pass any loads to the shaft. They can easily be configured such that they will not deform under any load.

In an embodiment the rotor comprises a magnet holding element that is supported on the rim support, the magnet holding element being manufactured from a material that is selected for its optimum magnetic flux guiding properties. Since the material of the rotor need not be selected for its mechanical strength it can be selected for optimum flux-guiding properties to increase efficiency of the electric motor.

In an embodiment the material of the magnet holding arrangement has a relative magnetic permeability of at least 100, especially in the range of 200 to 8,000, more especially in the range of 1,000 to 8,000.

In an embodiment the shaft is a hollow shaft, which reduces weight of the wheel and provides a space for providing required facilities for the electric motor.

In an embodiment the stator is supported on the hollow shaft, which provides a very good and stable support to the stator.

In an embodiment a cooling arrangement comprising a cooling space is provided in between the hollow shaft and the stator, and cooling conduits for providing a cooling fluid to the cooling arrangement are guided through the hollow shaft.

In an embodiment the hollow shaft defines an electronics compartment holding electronics for controlling the electric motor, and electrical connections for the electronics are guided through the hollow shaft, especially the electronics compartment being provided in a space surrounded by the stator.

In an embodiment the electronics compartment is a sealed compartment, especially meeting IP67 or higher standards.

In an embodiment the electronics compartment comprises a connector plate configured for providing electrical connections for the electronics and electric motor, and for the cooling arrangement.

In an embodiment the connector plate comprises a connector for a CAN bus.

In an embodiment the stator, rotor and electronics cooperate to provide a peak torque to the rim in a range of 3,000 Nm to 15,000 Nm, especially in the range of 6,500 Nm to 11,000 Nm.

In an embodiment the electromagnets comprise a paramagnetic core between coil windings.

In an embodiment the rim is sized and configured for mounting two tires, especially standard size tires.

In an embodiment the wheel further comprising a brake disc rigidly connected to the rotor, especially to the back plate.

In an embodiment the electronics comprise a DC capacitor bloc comprising high voltage foil capacitors.

In an embodiment the electronics comprise IGBT modules mounted on a cooling plate.

In an embodiment the IGBT modules provide a peak current in the range of from 700 Amperes to 1,000 Amperes.

In an embodiment the electronics comprise a monitoring device for ensuring ASIL compliance.

In an embodiment the monitoring device ensures ASIL C and/or ASIL D compliance.

In an embodiment the wheel allows free ingress and egress of water, wherein moisture sensitive components, especially at least one of the permanent magnets and the electromagnets, are coated with a hermetically sealing coating, especially a powder coating.

BRIEF DESCRIPTION OF THE DRAWINGS

Further features and advantages of the invention will become apparent from the description of the invention by way of non-limiting and non-exclusive embodiments. These embodiments are not to be construed as limiting the scope of protection. The person skilled in the art will realize that other alternatives and equivalent embodiments of the invention can be conceived and reduced to practice without departing from the scope of the present invention. Embodiments of the invention will be described with reference to the accompanying drawings, in which like or same reference symbols denote like, same or corresponding parts, and in which.

DETAILED DESCRIPTION OF EMBODIMENTS

Figure 1:
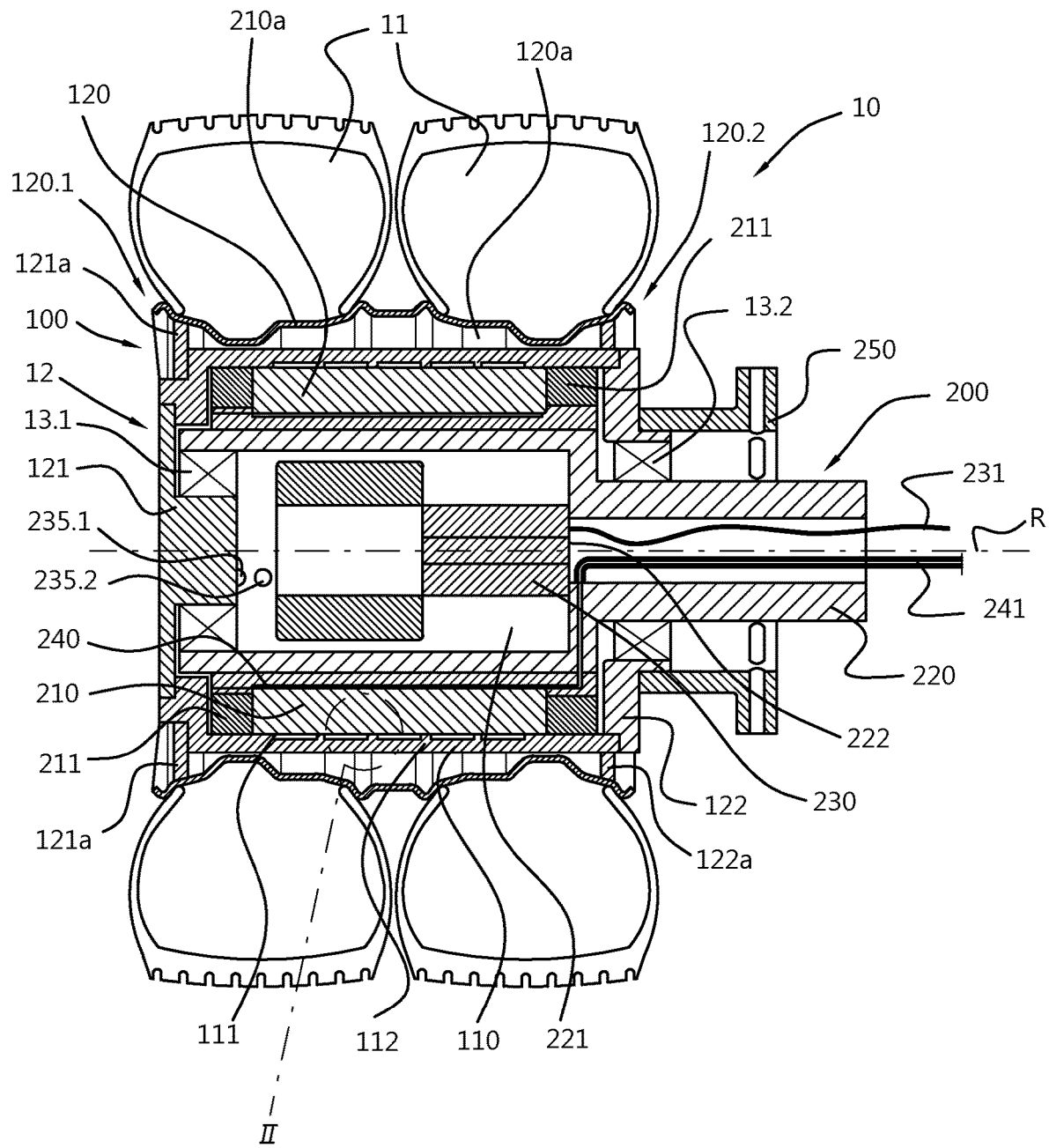
FIG. 1 shows a cross-section of a wheel according to the invention.

A wheel 10 for a road vehicle, such as a car, bus or truck, is shown in FIG. 1 and comprises a rotating part 100 and a static, non-rotating part 200. An electric motor 12 is arranged inside the wheel to provide for an in-wheel electric motor. Two tires 11 are mounted on a rim 120 of the wheel. In other embodiments one or more tires may be mounted on a suitable rim of the wheel, which can be standard size tires for the intended application of the wheel, such as for buses or cars. A first (front) plate 121 and a second (back) plate 122 together with their annular extensions 121a, 122a provide a rim support and are rigidly attached to the rim. The rim 120, the front and back plates 121, 122 and annular extensions 121a, 122a are rotating parts of the wheel and the rim is supported by the front and back plates and their annular extensions. The rim 120 has first and second ends 120.1, 120.2 along a rotation axis R of the wheel. The first/front plate 121 is associated with the first end 120.1 of the rim 120 and the second/back plate 122 is associated with the second end 120.2 of the rim. Bearings 13.1, 13.2 are provided in between the front (first) and back (second) plates of the rim support of the rotating part 100 and a hollow shaft 220 of the static part 200.

Figure 2:
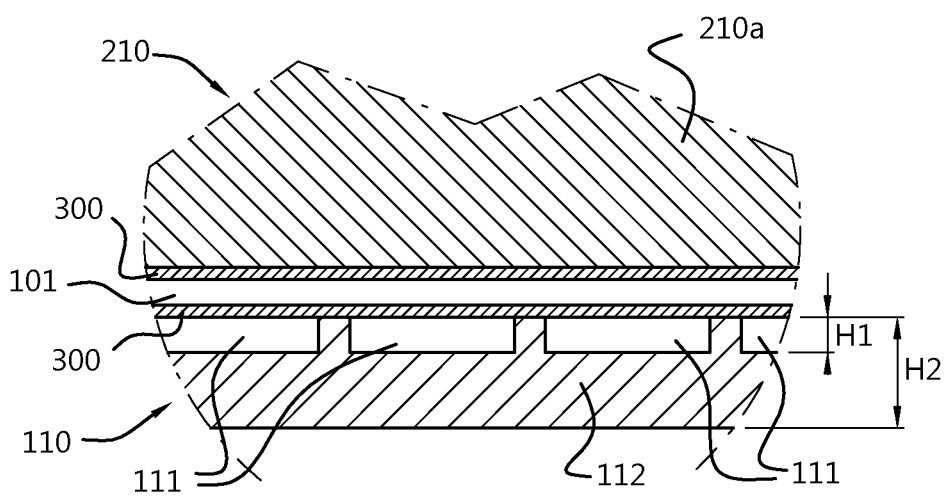
FIG. 2 shows a detail of the rotor with the permanent magnets.

The electric motor comprises a rotor 110 arranged on the rotating part 100 and a stator 210 arranged on the static part 200. A detail of stator and rotor is shown in FIG. 2. The rotor 110 is provided with permanent magnets 111 on an internal cylindrical surface of a magnet holding element 112, and the stator 210 is provided with electromagnets that are generally provided with coil windings 211. A paramagnetic core 210a can be provided between the windings. An air gap 101 is present between the permanent magnets of the rotor and the electromagnets of the stator. A phase and direction of electrical currents through the electromagnets is controlled so as to provide forces between the electromagnets of the stator and the permanent magnets of the rotor to induce rotation of the rotor with respect to the stator. Such techniques are generally known and will not be further explained in the present description.

The rotor 110 is configured for providing a strong magnetic field for interaction with the magnetic field provided by the electromagnet. Strong permanent magnets 111 are arranged on the magnet holding element 112. The material of the permanent magnets is selected for its strong magnetic properties. The height H1 of the permanent magnetics can therefore be kept smaller in comparison with permanent magnets from a magnetic material having less strong magnetic properties. The efficiency of the rotor is further dependent on the flux guiding properties of the magnet holding element 112. The element 112 does not bear any forces exerted on the rim, since such forces are directly channeled to the front and back plates 121, 122 and a gap 120a filled with air is provided in between the rotor and the rim. Therefore, the material of the magnet holding element 112 need not be selected on its mechanical strength but can be selected for optimum flux guiding properties. To achieve good magnetic flux guiding properties a material having a relative magnetic permeability larger than 100, especially in the range of 200 to 8,000, more especially in the range of 1,000 to 8,000 is selected for the magnet holding element 112. The permanent magnets 111 may be glued and/or mechanically fixed, such as by appropriate bolts, to the magnet holding element 112. The height H2 of the magnet holding element can therefore also be selected relatively small to allow bringing the air gap in between rotor and stator further away from the rotational axis, which improves efficiency and the ability to deliver torque. The torque provided by the electric motor is amongst others dependent on the strength of the permanent magnets, the magnetic flux guiding abilities of the magnet holding element and the internal circumferential length of the rotor, of which the rotor internal circumferential length plays a very crucial role. The rotor internal circumferential length is increased by bringing it further outwards since it is dependent on the internal diameter of the rotor. On the other hand the diameter is restricted by the size of the tires that should fit on the rim. By having strong permanent magnets 111 and an excellent flux guiding magnet holding element 112 one is allowed to make the magnet holding element thin and thus achieve a maximum internal diameter of the rotor within a given rim size.

The rotor with magnet holding element 112 and permanent magnets 111 and the electromagnets can be coated with a hermetically sealing coating 300 to protect them against corrosion. During manufacturing a powder coating is applied over these parts, which is subsequently cured at the required temperature to yield the hermetically sealing coating over the magnets.

The static part 200 further comprises a hollow shaft 220 that is configured for carrying the weight of the wheel and part of the vehicle on which the wheel is mounted. The hollow shaft may be mounted by any suitable mounting means to the suspension of the vehicle or to a sub frame or axle of the vehicle. Electronics 230 for controlling and driving the electric motor 12 are provided in an electronics compartment 221 of the hollow shaft and electronics cables 231 for the electronics 230 are guided through the hollow shaft 220 from the vehicle onto which the wheel is mounted. The electronics compartment 221 of the hollow shaft is a somewhat larger diameter part of the hollow shaft 220 in the embodiment shown, and is provided in a space surrounded by the stator 210 to have short electrical connections to the electromagnets. The electronics compartment 221 provides for a sealed housing for the electronics 230, for instance, compliant with IP67 standards. The sealed electronics housing may comprise connector plate 222 for providing connections for the electrical connections of the electronics and electric motor, especially for a CAN bus, and for the cooling space 240. The electronics comprise a DC capacitor bloc comprising high voltage foil capacitors, and IGBT modules mounted on a cooling plate. The IGBT modules provide a peak current in the range of 700 to 1,000 Amperes. The electronics also may comprise a monitoring module for ensuring ASIL compliance, especially ASIL-C or ASIL-D compliance.

A bearing 13.1 is provided internally of the hollow shaft 220 between the hollow shaft and the front plate 121 of the rotating part 100. Another bearing 13.2 is provided externally of the hollow shaft 220 between the hollow shaft and the back plate 122 of the rotating part. Any load on the tires and the rim is channeled via the front and back plates 121, 122 via the bearings 13.1, 13.2 onto the shaft 220. The load does not provide any force on the rotor 110 supported by the front and back plates, since there is no direct contact between the rim 120 and the rotor 110. A position sensor with position sensor parts 235.1, 235.2 is mounted on the front plate and inside the hollow shaft to sense a position of the rotating part 100 with respect to the static part 200. Any suitable position sensor can be employed.

The electromagnets 210 are mounted externally on the hollow shaft 220 with some spacing in between to allow a cooling liquid to be provided in this cooling space or labyrinth 240. The cooling space 240 can be configured such as to provide a continuous cooling layer or such as to provide a number of channels for the cooling liquid. Cooling conduits 241 is provided in the hollow shaft in connection with the cooling space to allow circulation of cooling liquid through the cooling space 241.

FIG. 1 further shows a brake disc 250 that is rigidly connected to the rotating part, especially the back plate 122 of the rotating part. The brake disc cooperates with further parts of a brake arrangement that is not shown in the drawings.

The invention claimed is:

1. A road vehicle wheel (10) with an in-wheel electric motor (12), the wheel comprising:
   a rotation axis (R),
   a stator (210), the stator comprising a hollow cylindrical body that is at a vehicle side connected to a shaft (220) and having an inner surface and an outer surface, on which outer surface electromagnets (211) are supported,
   a rotor (110) coaxially mounted around the stator, the rotor comprising permanent magnets (111) and being supported on the stator via a first bearing (13.1) at a road side and via a second bearing (13.2) at the vehicle side, and
   a rim (120) sized and configured for mounting two tires, wherein,
   the first bearing (13.1) is provided on the inner surface of the hollow cylindrical body and supports a roadside support plate (121) that radially extends above the outer surface of the cylindrical body and that supports a roadside part of the rotor (110) and a roadside rim support member (121a) that is situated axially at or near the first bearing (13.1),
   the second bearing (13.2) at the vehicle side supports a vehicle side of the rotor (110) and a vehicle side of the rim (120) via a vehicle side rim support member (122, 122a) that is axially situated at or near the second bearing (13.2),
   the rim at each axial position of the rotor (110) between the first and second bearings (13.1,13.2) is at a radial distance from the rotor,
   the hollow cylindrical body of the stator comprises a cylindrical electronics compartment (221) that is at the road side with an inner surface attached to the first bearing (13.1), the bearing supporting an axially extending cylindrical stub of the roadside support plate (121), and
   the electronics compartment (221) is accessible by removal of the roadside support plate (121) from the stator and the rim.

2. The road vehicle wheel according to claim 1, wherein an axial length of the rim (120) is substantially similar to an axial length of the rotor (110).

3. The road vehicle wheel according to claim 2, wherein, the electronics compartment (221) is provided in a space surrounded by the stator (210) holding electronics (230) for controlling the electric motor (12), and
   the shaft (220) is hollow and electrical connections (231) for the electronics are guided through the shaft (220) to the electronics compartment.

4. The road vehicle wheel according to claim 1, wherein there is a gap (120a) between the rotor (110) and the rim (120), the gap being filled with a gas.

5. The road vehicle wheel of claim 4, wherein the gas is air.

6. The road vehicle wheel according to claim 1, wherein the rim (120) has first and second ends (120.1,120.2) along the rotation axis R of the wheel, a rim support (121,122) being associated with the first and second ends of the rim.

7. The road vehicle wheel according to claim 6, wherein the rim support comprises the roadside support plate (121) and a back plate (122) associated with the first and second ends (120.1, 120.2) of the rim (120) and the rotor (110) being supported by and provided in between the roadside support plate (121) and the back plate (122).

8. The road vehicle wheel according to claim 7, further comprising a brake disc (250) rigidly connected to the back plate (122).

9. The road vehicle wheel according to claim 6, wherein the rotor (110) comprises a magnet holding element (112) that is supported on the rim support (121, 122), the magnet holding element being manufactured from a material having magnetic flux guiding properties.

10. The road vehicle wheel according to claim 9, wherein the material of the magnet holding element (112) has a relative magnetic permeability of at least 100.

11. The road vehicle wheel of claim 10, wherein the material of the magnet holding element (112) has a relative magnetic permeability in the range of 200 to 8,000.

12. The road vehicle wheel of claim 10, wherein the material of the magnet holding element (112) has a relative magnetic permeability in the range of 1,000 to 8,000.

13. The road vehicle wheel according to claim 1, wherein the shaft (220) is hollow, the stator (210) being supported on the shaft (220), wherein a cooling arrangement with a cooling space (240) is provided in between the shaft (220) and the stator (210), and cooling conduits (241) for providing a cooling fluid to the cooling arrangement are guided through the shaft.

14. The road vehicle wheel according to claim 1, wherein the stator (210), the rotor (110) and the electronics (230) cooperate to provide a peak torque to the rim (120) in a range of 3,000 Nm to 15,000 Nm.

15. The road vehicle wheel according to claim 1, wherein the electromagnets (230) comprise a paramagnetic core (210a) between coil windings (211).

16. The road vehicle wheel according to claim 1, further comprising a brake disc (250) rigidly connected to the rotor.

17. The road vehicle wheel according to claim 1, wherein an axial length of the rim (120) is equal to an axial length of the rotor (110).

18. The road vehicle wheel according to claim 1, wherein the stator (210), the rotor (110) and the electronics (230) cooperate to provide a peak torque to the rim (120) in a range of 6,500 Nm to 11,000 Nm.

19. The road vehicle wheel according to claim 1, allowing free ingress of water, wherein at least one of the permanent magnets and the electromagnets are coated in a hermetically sealing coating.

20. The road vehicle wheel according to claim 19, allowing free ingress of water, wherein the at least one of the permanent magnets and the electromagnets are coated in a powder coating.

* * * * *